Jan. 28, 1936.  O. A. ROSS  2,029,198
LUBRICANT METERING DEVICE
Filed March 10, 1927
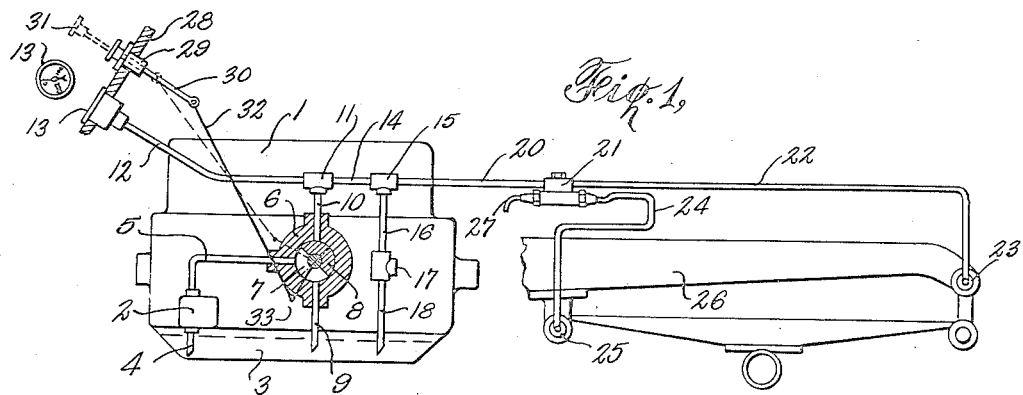
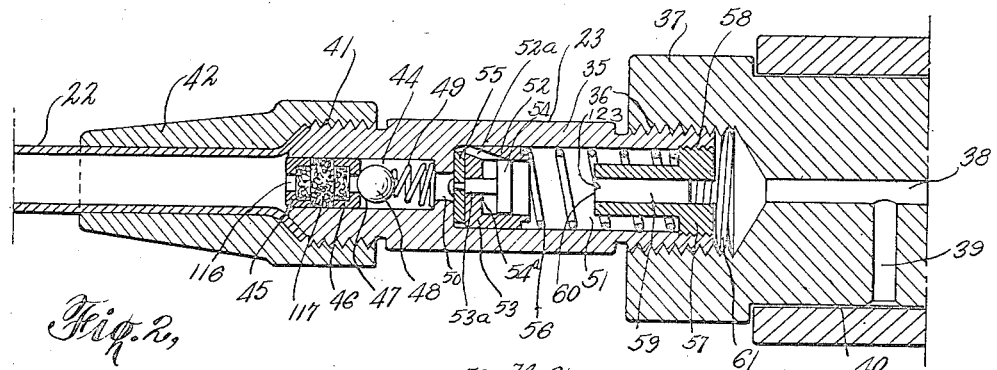
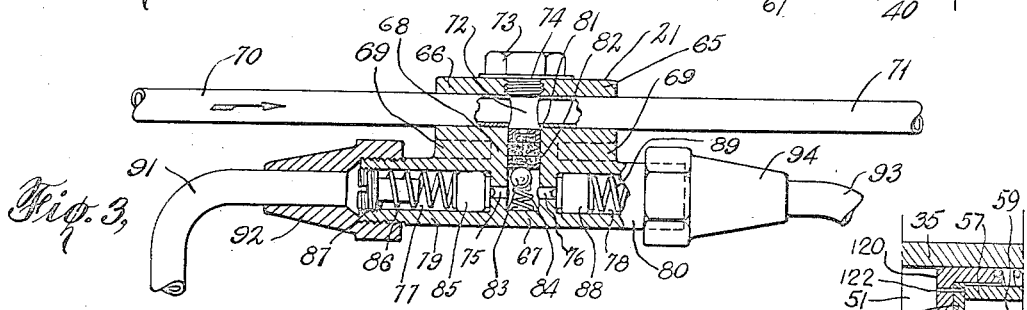
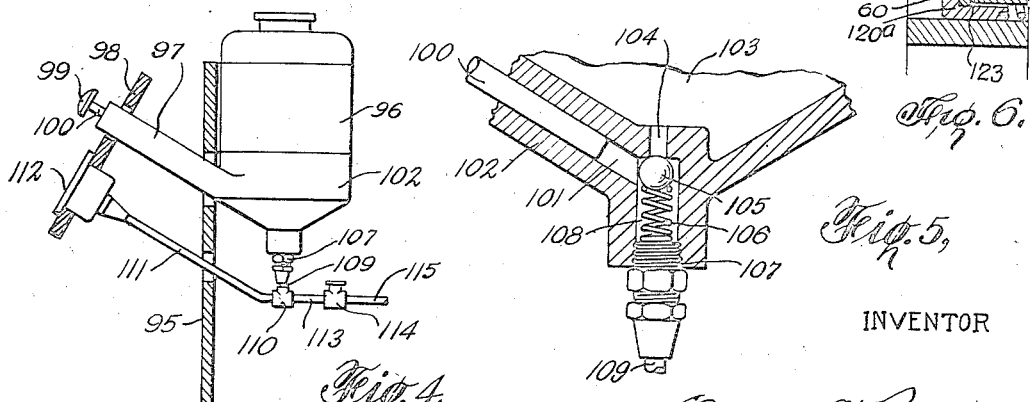
INVENTOR
Oscar A. Ross.

Patented Jan. 28, 1936

2,029,198

UNITED STATES PATENT OFFICE 2,029,198

LUBRICANT METERING DEVICE

Oscar A. Ross, New York, N. Y.

Application March 10, 1927, Serial No. 174,221

27 Claims. (Cl. 184—7)

This invention relates to lubricating systems, and more particularly to that class known as chassis lubricating systems employed on motor propelled vehicles.

One object of this invention is to furnish a chassis lubricating system wherein a metered quantity of oil is supplied to each part to be lubricated in a manner whereby after the definite quantity has been received at the part, no further oil can flow thereto until the pressure controlling the oil supply has been discontinued.

Another object is to furnish a chassis lubricating system wherein, not only a fixed quantity is fed to each part to be lubricated, but in addition this quantity may be varied to best suit the needs of the part, be it large, or small. By this arrangement each part to be lubricated receives the proper amount of oil insuring adequate lubrication and efficient operation of the chassis parts as a whole.

Another object is to furnish a chassis lubricating system wherein the oil employed in the motor of the vehicle may be supplied to the chassis lubricating system from the oil reservoir contained within the motor, in this manner avoiding the use of separate oil supply tanks for said system.

Another object is to furnish a chassis lubricating system wherein the supply of oil is actuated by the operation of the motor, in this manner avoiding the attachment of an oil pump and tank to the dash board of the vehicle, and further, insuring a warm supply of oil which will flow freely through the pipes of the system.

Another object is to furnish a chassis lubricating system wherein the main supply line is made up without dis-connectable joints, except those required for its connection to the distributing point of the system, in this manner reducing to a minimum, the possibility of leaks, also reducing to a minimum the number of dis-connectable joints which are subject to strain due to the twisting of the chassis frame.

Another object is to furnish a chassis lubricating system wherein the operator of the vehicle is cognizant of the conditions surrounding the entry of oil into the system and can accurately determine when all the lubricated parts have received their quota of oil, or if the temperature of the oil is too low to permit proper lubrication of the system, or if any leak exists in the system whereby continued supply of oil thereto would result only in waste instead of proper lubrication of the parts.

Another object is to furnish a chassis lubricating system wherein lubricant from a source is supplied to a supply line having a plurality of metering devices connected thereto at spaced intervals, each device being arranged to meter and trap a substantially fixed quantity of lubricant therein in a manner to prevent return of any portion of said trapped lubricant to the line when the pressure at the source is released thereby preventing "hunting", namely, flow of the lubricant from one metering device to another due to air pockets formed between a metering device and its correlated part to be lubricated.

Other objects and advantages will appear as the description of the invention progresses, and the novel features of the invention will be pointed out in the appended claims.

This invention consists of the novel construction and arrangement of parts hereinafter described, delineated in the accompanying drawing, and particularly pointed out in that portion of the instrument wherein patentable novelty is claimed for certain and peculiar features of the system, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawing, wherein I have illustrated one embodiment of my invention, and wherein like characters of reference designate corresponding parts through the several views, and in which:—

Figure 1 is a diagrammatic view showing the application of the system to a hydrocarbon motor vehicle, and Fig. 2 is a sectional view, enlarged, of an oil metering device attached to a chassis part to be lubricated, and, Fig. 3, is a part sectional, part elevated view of a dual oil metering unit attached to the main oil supply line, and, Fig. 4 is an elevated view of an oil supply tank employed on electric motor vehicles, or the like, and Fig. 5 is an enlarged sectional view of a portion of the tank shown in Fig. 4, and Fig. 6 is a modified form of the metering piston shown in Figs. 2 and 3.

Referring to Fig. 1, driven by the hydrocarbon motor 1, which may be of any well known make, is oil supply pump 2, normally withdrawing oil from reservoir 3, through pipe 4 to said pump, from whence it passes through pipe 5 into chamber 7 of three-way valve 6, and in the normal position, as shown, returning to the reservoir 3 through pipe 9. Also secured to valve 6 and adapted to communicate with chamber 7, is pipe 10 terminating in three-way fitting 11, one branch of which is connected to pipe 12, terminating in pressure gage 13, and the other to pipe 14, the other end of which terminates in a three-way fitting 15, one branch of which is connected to one end of pipe 16, and the other to relief valve 17, the outlet from which is conducted to reservoir 3 by pipe 18, the other branch being connected to pipe 20 forming part of the distribution system, and to which the dual metering unit 21 is connected, the system continuing in pipe 22 to the single oil metering unit 23. The dual oil metering unit, as 21, has pipe 24, shown as connected to spring bolt 25, of chassis 26, and pipe 27 is assumed to be connected to the relatively adjacent bolt on the opposite side of the chassis.

To dash 28, is secured bushing 29, adapted to slidably receive operating rod 30, to one end of which is secured operating handle 31, and to the other is pivotally secured rod 32 terminating in operating lever 33 of oscillating valve member 8.

Referring to Fig. 2, illustrating a single oil metering unit, as, 23, the tubular body 35 has threaded end 36, adapted to be secured to a chassis part to be lubricated, as, for example, spring bolt 37, having oil grooves 38 and 39 adapted to feed oil to bearing 40. The opposite end of body 35 has the threaded end, or extension, 41 adapted to receive pipe connecting sleeve 42 serving to seal pipe 22 with said extension.

Extension 41 also comprises the chamber, or counter-bore 44, secured in which are the cup-shaped members, or stampings, 45 and 46, and between which is clamped the filtering material 117, member 46 also having valve seat 47 against which ball valve 48 is normally restrained by action of spring 49.

Communicating with chamber 44, by passage 50, is reservoir, or metering chamber 51, operating in which is piston, or metering valve 52 normally located adjacent opening 50, as shown, said piston comprising cup-shaped member 53, in the central opening 53a of which operates the stem of valve 54, and to which is rigidly secured the movement limiting washer 55. Piston 52 is normally restrained to move to the left by action of spring 56, one end of which is secured to piston member 53, and the other impinging on valve seat member 57 having threaded head 58 screwed into the open end of chamber 51 and acting as a seal thereto. Valve seat member 57 also comprises canal 59, one end of which terminates in seat 60 having leakage groove 123, and adapted to be closed by valve 54 as piston 52 moves to the right, and the other end communicating with chamber 61 from which lead the oil grooves 38 and 39 in spring bolt 37.

Referring to Fig. 3, illustrating the preferred form of a dual oil metering unit, as 21, the body member 65 comprises two longitudinal cylindrical portions 66 and 67 connected by a vertical cylindrical member, or portion, 68 and webs 69—69. The member 66 has axially located and hermetically secured therein the main oil supply lines 70 and 71. Axially disposed in member 68 and extending diametrically through member 66 and partially into member 67, is canal 72 communicating with oil supply lines 70 and 71, and the upper end of which is sealed by the screw plug 73 and washer 74, and the lower end terminating in orifices 75 and 76 communicating with oil metering chambers 77 and 78 in the opposite extremities 79 and 80 of cylinder 67.

In canal 72 are rigidly secured the cup-shaped members, or stampings 81 and 82 of the same construction and for the same purposes as members 45 and 46, of unit 23, also the ball check 83 and spring 84, similar to and for the same purpose as ball 48 and spring 49 of unit 23.

Arranged in metering chamber 77 is the piston 85, spring 86 and valve seat member 87, similar in construction and for the same purpose as piston 52, or 120, to be hereinafter described, spring 56 and valve seat member 57 of unit 21. Oil metering chamber 78 has a similar set of parts consisting of piston 88, spring 89 and valve seat member, the latter not shown.

Communicating with oil metering chamber 77 through the valve seat member 87 is the pipe 91 secured to extension 79 by sleeve 92, and, communicating with oil metering chamber 78 through a valve seat member in extension 80 corresponding to valve seat member 87, is pipe 93 secured to extension 80 by sleeve 94.

Referring to Fig. 6, illustrating the modification of a piston, as 52, the modified piston 120, comprises the cup-shaped member 120a secured to which is valve seat 121. Leakage orifice 122 passes through both the member 120a and seat 121 making a communication to each side of the piston 120, however in the extreme right position as shown this orifice is closed by seat 60, and at the extreme left by the end wall of chamber 51.

Referring to Figs. 4 and 5; to the hood board 95, is secured the oil reservoir 96 having pump 97 extending through dash board 98, said pump having operating handle 99 and plunger 100 extending into pump cylinder 101 forming part of the cast chamber 102 of reservoir 96. Cylinder 101 communicates with the interior 103 of reservoir 96 by canal 104, the lower end of which is normally closed by ball check valve 105, spring 106 secured to bushing 107, serving to hold said valve to its seat. Bushing 107 also serves to conduct oil from chamber 108 to pipe 109 as plunger 100 is depressed and from whence it is forced through pipe 109 to fitting 110, one branch of which is connected to pipe 111 terminating in gage 112, and the other to pipe 113 terminating in relief valve 114, thence continuing to the system via pipe 115.

No oil flows in pipe 111 other than that required to indicate the static head, or pressure of the oiling system on gage 112.

The reservoir 96 and connections shown in Figs. 4 and 5, are employed on vehicles, as for example, electrically driven vehicles, on which no suitable oil reservoirs are maintained wherefrom oil may be drained for lubricating the chassis parts.

The operation of the system is as follows:— referring to Figs. 1, 2, and 3, the oil pump 2, driven by motor 1 is assumed to be normally operating when the said motor is idling. Under this condition oil from reservoir 3 is drawn to pump 2 thence passing to chamber 7 from whence it is returned to said reservoir 3 via pipe 9.

When it is desired to lubricate the chassis parts, the handle 31 is drawn upwardly, as shown by the dotted position of Fig. 1, whereupon the rod 32 through lever 33 rotates valve member 8 clockwise until the orifice to pipe 9 is closed and the orifice to pipe 10 is opened, the oil now passing through pipe 10 to fitting 11, pipe 14, fitting 15, pipe 20, part going to dual oil metering unit 21, and the remainder flowing through pipe 22 to the single oil metering unit, as 23, or such other similar units, approximately 30, or more of which may be employed on a chassis, as 26.

After the oil has been metered to each unit as 21, or 23, and as will hereinafter be more fully described, and at which time the demand for oil to the system will cease, the accumulated pressure built up by pump 2 continuing to operate will cause relief valve 17 to open whereupon the surplus oil will pass to reservoir 3 via pipe 18. During the period that the handle 31 is elevated, the several pressures produced as pump 2 forces oil into the system will be indicated by the gage 13. As the oil metering units as 21 and, or 23, adjacent the pump are being filled, the pressure indicated will be comparatively low, and, as said adjacent units become filled with oil and are sealed, and as will be hereinafter more fully described, the more remote units will begin to fill, and, as this occurs a higher pressure will be indicated on gage 13 due to the friction loss in the additional length of pipe through which the oil is carried to said more remote units. After all of the oil metering units of the system have become filled and the pressure relief valve 17 is restrained to open by continued action of pump 2, the comparatively high pressure required to open said valve will be indicated on gage 13 informing the operator that the system has been filled and that he should release handle 31 whereby valve member 8 will be restored to its normal position for returning the oil to reservoir 3 via pipe 9.

As oil from pipe 22 is forced into unit 23, it first passes through orifice 116 of retainer 45 and thence through filtering material 117 to valve seat 47 of retainer 46, unseating valve 48 whereafter it escapes through orfice 50 to metering chamber 51. As it enters and fills said chamber, valve 52 is restrained to move to the right until valve 54 seats against seat 60 thereby closing canal 59 to chamber 61. The body 53 of valve 52 however continues to move to the right under pressure of the entering oil until the inner wall 54a impinges against the valve 54 causing a more certain seating thereof. As this occurs the port 52a is uncovered whereby oil from the left side of the piston 52 may pass to the right side, however as canal 59 is closed by valve 54, no oil can flow to the chamber 61, or oil grooves 38 and 39. Ordinarily the units, as 21 and 23 are so located with reference to the part to be lubricated that the lubricant metered and subsequently restrained through the ports, as 52a or 122, flows to the part by gravity during the non-supply periods, thereby leaving the chamber and the passageways to the right, or outlet side of the metering piston, as 52 and 120 substantially filled with air, and, as said pistons are restrained to the right by the lubricant entering the metering chambers, as 51, said air is compressed in said passageways. Whereas some of said compressed air may pass through the canals of the lubricated parts to the atmosphere, a well fitted part in a bearing will resist such movement during short intervals of time, and, as the pressure of the lubricant from the source is relieved by the lowering of handle 31, and the piston, as 52 or 120 leaves the seat 60, said compressed air would normally tend to pass through the ports, as 52a or 122 and thereby restrain the metered portion of lubricant to return to the supply line and thence to some metering chamber where no such compressed air was present, or to a minor leak in the system, or to the supply line and to another metering unit of a higher temperature where, due to the lower viscosity of the lubricant, the metering operation has been more rapid with respect to that portion of the operation transpiring after the pressure has been relieved. However due to the presence of valve 48 and spring 49, such return to the supply line or other metering units becomes impossible and the metered quantity of lubricant is ultimately restrained to pass through the port as 52a or 122 to the left, or outlet side of the metering piston and thence to the part to be lubricated as the spring 56 restrains said piston to the inlet end of the metering chamber 51. A definite quantity of oil has now been metered to chamber 51, and, as has been heretofore stated, as long as the pressure of the system is maintained by pump 2, no oil can flow to the lubricated part, as for example, spring bolt 37. Under this condition and after all the units, as, 21 and 23 have metered their respective quota of oil, the pressure indicated on gage 13 will abruptly rise informing the operator that all the units of the system have been filled, whereupon he will release handle 31 thereby cutting off supply of oil from pump 2 as hereintofore described.

In valve seat 60 is a small leakage groove 123, and, after the pressure on the system has been relieved by releasing handle 31, the leakage of oil through groove 123 into canal 59 from chamber 51 will subsequently relieve the pressure in chamber 51 to the left of piston valve 52 whereupon spring 56 restrains said piston valve 52 to move to the left and the oil metered to the left side of said piston is caused to pass through port 52a to the right side of said piston, valve 48 preventing said oil to pass back to said system.

After piston 52 has moved to the extreme left and the oil metered to the left of the piston has passed to the right thereof, the final movement of said piston to the left will cause valve 54 to again close port 52a whereupon the unit is ready for another metering operation.

After the metered oil has passed to the right side of piston 52 and the port 52a is closed, the disposition of said oil will be dependent upon the axial disposition of the unit, as 21, or 23. If the extremity 36 is disposed upwardly, the oil will remain in the metering chamber 51, if downwardly, it will flow through the canal 59 to the part to be lubricated, if horizontally disposed approximately one half of the oil will flow through the canal 59 to the parts to be lubricated. In any one of the positions named it is obvious that each metering operation will supply the metered quantity to the part to be lubricated.

As the time interval required for metering the oil to all the units of a chassis is only the matter of five to ten seconds, the quantity of oil which may pass leakage groove 123 is negligible.

In the modified form of metering unit shown in Fig. 6, the oil entering chamber 51 restrains piston 120 to move to the right until valve member 121 is caused to seat on seat 60 whereupon transfer port 122 is closed. Transfer port 122 is of comparatively small area, and as the interval of time required for piston 120 to pass from the extreme left to the extreme right positions, is comparatively small, normally not exceeding one second, the amount of oil escaping through said port during said movement will be negligible.

After the pressure on the system has been relieved by releasing handle 31, the leakage of oil past the wearing surface of piston 120 will relieve the pressure in chamber 51, and, as this occurs valve 120 will leave seat 60 under strain of spring 56 and will continue to move to the left, the metered quantity of oil to the left of said piston passing to the right thereof through transfer port 122, the ball valve 48 (not shown) restraining said oil from returning to the system.

On a motor vehicle chassis many of the lubricated parts are in duplicate, as for example, spring shackle bolts, steering knuckle pins, etc. At these locations it is preferable to employ a dual metering unit, as, 21, of Fig. 3, whereby the oil is metered adjacent the main oil supply line, as pipes 70 and 71, and then communicated to the parts to be lubricated through pipes as 91 and 93. In unit 21 the oil to be metered passes from supply pipe 70 to canal 72 and thence past retainers 81 and 82 and the interposing filter 117 to valve 83 from whence it divides, part passing through canal 75 to chamber 77, and the remainder through canal 76 to chamber 78 whereafter the action is the same as hereintofore described in connection with unit 23.

By placing the oil metering units, as 21, adjacent the main oil supply line, as 70 and 71, and hermetically sealing said line by soldering, or brazing the pipes as 70 and 71, into the unit, the possibility of leakage of the system is reduced to a minimum. This is due to the fact that the dis-connectable joints are on the low pressure side of the units and therefore not subject to the high pressure of the distributing pump 2. It is well known that a chassis frame is subject to vibration and twisting when in service and that dis-connectable joints work loose. With units as 21 installed in a chassis lubricating system, any loosening of a dis-connectable joint, as 92, or 94, due to vibration, or twisting of the chassis, will not permit leakage of oil from the system during the metering period (high pressure period), and, after the pressure has been relieved, as hereintofore described, and the metered oil flows into the subsidiary distribution pipes, as 91 and 93, no pressure is present, and, even though these joints may be loosened no leakage will obtain except that from capillary attraction through the loosened joint.

It is obvious that the extensions 79 and 80 of unit 21, may be disposed vertically, or obliquely whereby the valve seat member, as 87 will be disposed to empty the metered oil into pipes 91 and 93 as soon as the oil emerges from canal 59.

Referring to Figs. 4 and 5, as hereintofore stated the oil reservoir 96 is employed as a substitute for the pump 2 and valve 6 when oil in a reservoir as 3, is not available on a vehicle for chassis lubricating purposes. The pump plunger 100 is preferably proportioned whereby a pressure of approximately ten pounds downward on handle 99 will produce a pressure of approximately 200 pounds per square inch in the oil supply pipes of the system, also that the capacity of each stroke is such that approximately five to ten strokes requiring the same number of seconds, will completely fill all of the metering chambers, as 51, of the system, the oil from reservoir 96 passing through orifice 104 and past valve 105 to cylinder 101 as the handle 99 is elevated, and, as said handle is depressed, from cylinder 101 to canal 106, thence through bushing 107 to pipe 109, fitting 110, relief valve 114 and pipe 115 forming the main supply line to the system. The gage 112 serves the same purpose as gage 13 of Fig. 1.

It is well known that the lubricating oil in hydrocarbon motors becomes diluted by the heavier portions of the motor fuel which leak past the piston into the crank-case. This dilution causes a slightly lower viscosity of the oil, and it has been found that this lessened viscosity greatly reduces the resistance to flow of the oil in the pipes as 70 and 71, of the system. Furthermore, this dilution has the additional advantage that it acts as a cleanser, and when metered to a part to be lubricated, it cleanses, as well as lubricates said part.

When it is desired to supply the entire metered quantity of oil in chamber 51 to any lubricated part instantly, whereby a flushing, or distributing effect is obtained, and the location of a unit, as 21, or 23, so permits, it is vertically disposed with the distributing end 36 facing upwardly. In this position there is no tendency for the metered quantity of oil to leave chamber 51 after piston 52, or 120, has moved to the extreme left, therefore when the next metering operation takes place, and the piston 52 moves rapidly to the right, said oil will be rapidly forced to the oil grooves of the part to be lubricated. If however the location of said units requires that it be disposed horizontally, the feed pipe, as 24, may be formed whereby a portion is disposed above the unit, as shown in Fig. 1.

This improved system permits of the use of distribution pipe, or tubing of large size, and in practice three sixteenths inside diameter is recommended for passenger vehicles and one quarter inch inside diameter for trucks, the latter vehicles requiring more rugged construction of the system, due to more severe vibration to which they are subjected.

During the metering operation of the system it has been determined that, as the various units, as 21, and, or 23, are metering their quotas of oil, the pressure on gage 13 will register from approximately 20 to 60 pounds, and after the system has become filled, said pressure will suddenly increase to approximately 200 pounds, the relief valve 17 being preferably adjusted for this condition.

The size of pump 2 is preferably so proportioned, that the rate of flow of oil therefrom at idling speed of the engine 1, will meter oil to a chassis system comprising from 30 to 50 units, as 21, and, or, 23, in approximately 15 to 20 seconds. For this reason, if gage 13 does not register 200 lbs. in 20 seconds (a slow count of 20), the operator will have knowledge that, in all probability, a leak has obtained in the main supply line and should be repaired. Further, if the gage immediately indicates 200 lbs., when elevating handle 31 in cold weather, the operator will have knowledge that the oil in the supply lines is congealed to the extent that proper lubrication of the chassis parts to be lubricated cannot obtain, and that if such lubrication is desired, the vehicle, to which the system is attached, must be deposited in a warmer enclosure.

To vary the amount of oil metered by a unit, as 21, or 23, the axial length of the valve seat member 57 is varied. If a lesser quantity is required, said member is made longer, in this manner shortening the stroke of piston 52, or 120. If a larger quantity is desired, the valve seat member 57 is made shorter, in this manner increasing the stroke of said piston. This variation of metered quantity may also be obtained by supplying additional thread for the head 58 of valve seat member 57, and screwing said member in or out in chamber 51, suitable means being supplied for locking said member in position after final adjustment.

It will be apparent that the pump 2, may be normally inoperative and a suitable clutch, actuated by rod 32 may connect said pump with the motor 1 during the metering operation.

If desired the pump 2, may be also utilized for the purpose of feeding the used motor oil to an oil filter, or rectifier, as now largely employed on motor vehicles. In such an instance the pump 2 would normally pump the used oil from the crank case of the motor to the rectifier and thence to the reservoir 3. When handle 31 is elevated for purposes of metering oil to the chassis lubricating system, said pump will supply rectified oil to the system from the rectifier, the overflow passing through valve 17 to the reservoir 3, as hereintofore described.

What I claim is:—

1. In combination, a source of lubricant, a part to be lubricated, a lubricant metering device connected between the source and the part comprising; a member containing a metering chamber having an inlet passage connected to the source and an outlet passage connected to the part, a metering piston arranged to travel between the inlet and the outlet ends of the chamber arranged to act as a seal therebetween, a port therein for transferring the lubricant from the inlet side to the outlet side of the piston, a valve member supported by the piston controlled by the movement thereof arranged to close the port as the piston is moved to the inlet end and open the port as the piston is moved to the outlet end of the chamber, resilient means normally urging the piston to the inlet end of the chamber, means for supplying lubricant under pressure from the source to the chamber whereby the chamber is filled with lubricant and the piston is moved to the outlet end of the chamber and the movement thereof actuates the valve to open the port during the final movement thereof, and means for relieving the pressure whereby the resilient means normally restrains the piston to the inlet end of the chamber and the movement thereof transfers the lubricant through the port from the inlet side to the outlet side of the piston and subsequently restrains the valve to close the port and restore the device to normal operating position as the piston impinges on the inlet end of the chamber.

2. In combination with a source of lubricant and a part to be lubricated, of a lubricant metering device connected between the source and the part comprising; a member containing a metering chamber having an inlet passage connected to the source and an outlet passage connected to the part at opposite ends thereof, a valve in the inlet passage, arranged to permit flow of the lubricant from the source to the chamber but not therefrom, a piston normally positioned at the inlet end of the chamber arranged to travel between the inlet and outlet ends thereof, control means supported by the piston arranged to be actuated by impingement with the inlet and outlet ends of the chamber during the extreme movements thereof for rendering the piston effective as a seal in the chamber between the inlet passage and the outlet passage when the lubricant is supplied thereto and the movement of the piston is from the inlet end to the outlet end of the chamber and ineffective to so seal when the movement is from the outlet end to the inlet end thereof, and resilient means for normally urging the piston to the inlet end of the chamber whereby the trapped quantity of lubricant is conveyed from the inlet side to the outlet side of the piston and subsequently to the part to be lubricated.

3. The combination with a source of lubricant and a part to be lubricated, of a lubricant metering device interposed between the source and the part comprising, a body member normally connected between the source and the part having a metering chamber therein arranged to receive lubricant from the source through one end thereof and discharge the lubricant to the part through the other end thereof, a metering piston arranged to travel between the receiving and discharge ends of the chamber, a passageway formed in the piston between the receiving and discharge ends thereof, means supported by the piston arranged to close the passageway upon movement of the piston to the receiving end of the chamber and open the passageway upon movement thereof to the discharge end of the chamber, and means resiliently urging the piston to the receiving end of the chamber.

4. A lubricant metering device comprising, a body member having a bore portion formed thereon including a bore arranged to support a lubricant supply line, a metering portion formed on the body member having a plurality of metering chambers therein, an intake passageway extending between the bore and metering chambers having the bore end thereof openable to atmosphere, a cap member normally closing the opening to atmosphere, means associated with the chambers for metering substantially fixed quantities of lubricant to the parts upon alternately establishing and releasing the pressure thereof in the supply line, and a valve in the intake passageway arranged to permit flow of the lubricant from the source to the chambers but prevent return flow thereof to the supply line.

5. A lubricant metering device comprising, a body member, a chambered lubricant receiving portion formed thereon having a lubricant supply line integrally joined thereto for supplying lubricant to the chamber, a metering portion formed on the body member having a plurality of metering chambers formed therein, an intake passageway formed in the body member extending between the chambers of the receiving and metering portions, means connecting each metering chamber to a correlated part to be lubricated for conveying lubricant therebetween, means associated with the chambers for metering substantially fixed quantities of lubricant to the parts upon alternately establishing and releasing the pressure thereof in the supply line, and a valve positioned in the intake passageway arranged to permit flow of the lubricant from the line to the metering chambers but prevent return flow thereof to the line.

6. A lubricant metering device for supplying lubricant from a source to a part to be lubricated comprising, a body member having an intake bore and a metering chamber arranged successively between the inlet and outlet ends thereof, the inlet end of the bore communicating with the source and the outlet end thereof communicating with the inlet end of the metering chamber, an orificed seating member secured in the intake bore spacedly between the ends thereof, a check valve positioned between the seating member and the outlet end of the bore arranged to seat on the member for normally closing the orifice, an orificed retaining member in the bore positioned between the seating member and the inlet thereof, filtering means positioned between the seating member and the retaining member for filtering the lubricant flowing to the chamber, and means associated with the metering chamber for metering substantially fixed quantities of lubricant from the source to the part upon alternately establishing and releasing pressure thereof at the source.

7. A lubricant metering device for metering lubricant from a source to a part to be lubricated comprising, a casing member having an inlet end connected to the source and an outlet end connected to the part, an inlet bore and a metering bore formed co-extensively between the inlet and outlet ends of the casing member, an outlet member supported by the outlet end of the metering bore having an outlet passageway communicating with the part, an inlet valve operable solely within the inlet bore between the ends thereof arranged to permit lubricant to flow from the source to the metering bore but prevent return flow thereof to the source, a metering valve reciprocable in the metering bore arranged to close the outlet passageway upon movement thereof to the outlet end of the bore, and means engaging the outlet member for resiliently urging the metering valve to the inlet end of the metering bore.

8. The combination with a source of lubricant and a part to be lubricated, of a lubricant metering device connected between the source and the part comprising, a member containing a metering chamber having an inlet passageway connected to the source and an outlet passageway connected to the part, a valve controlling the inlet passageway arranged to permit flow of lubricant from the source to the chamber but prevent flow from the chamber to the source, a piston normally positioned at the inlet end of the chamber arranged to travel between the inlet and outlet ends thereof, a port in the piston, a by-pass valve member including a by-pass valve supported by the piston arranged to be moved relatively thereto by impingement of the valve with the inlet and outlet ends of the chamber for rendering the by-pass valve effective to close the port when the piston is constrained to the inlet end of the chamber whereby a fixed quantity of lubricant will be trapped therein as the lubricant is supplied thereto under pressure and open the port when the piston is constrained to the outlet end of the chamber, and resilient means normally constraining the piston to the inlet end of the chamber whereby the trapped quantity of lubricant is conveyed through the port from the inlet to the outlet side of the piston and subsequently to the part to be lubricated.

9. A lubricant metering device for supplying lubricant from a source to a part to be lubricated comprising, a casing member having the inlet end thereof connected to the source and the outlet end thereof connected to the part to be lubricated, an intake passageway and a metering bore formed successively between the inlet and outlet ends of the casing member, the intake passageway connecting with the source and the metering bore connecting with the part to be lubricated, a check valve in the intake passageway arranged to permit flow of lubricant from the source to the metering bore but prevent backflow thereof, a metering piston movable between the inlet and outlet ends of the metering bore arranged to close the outlet end upon movement of the piston thereto, means resiliently urging the piston to the inlet end of the bore, and flow control means operable by movement of the piston arranged to permit flow of the metered lubricant from the inlet side of the piston to the outlet side thereof solely during the movement of the piston from the outlet end to the inlet end of the bore, the flow control means being bodily moved with the piston upon the initial movement of the piston from the inlet end to the outlet end of the metering bore.

10. A lubricant metering device for supplying lubricant from a source to a part to be lubricated comprising, a body member having a lubricant metering chamber formed between the inlet and outlet ends thereof, the inlet end being connected to the source and the outlet end thereof being connected to the part, a metering piston reciprocating in the chamber between the inlet and outlet ends thereof for metering lubricant from the source to the part, and a by-pass valve supported by the piston arranged to permit flow of lubricant from one side of the piston to the other upon movement thereof to one position but prevent flow of the lubricant upon movement to another position, the valve being moved to one position as the piston approaches one end of the chamber and to the other position as the piston approaches the opposite end thereof.

11. A lubricant metering device comprising, a casing having an inlet and an outlet, a cup shaped piston movable in the casing arranged to be inserted thereinto solely through the outlet, and an outlet member secured at the outlet of the casing having a seating portion arranged to enter into the recess of the piston for closing the outlet, the piston being removable from the casing solely upon removal of the outlet member from the outlet.

12. A lubricant metering device comprising, a casing having an inlet and an outlet, a piston engaging the inner wall of the casing having a by-pass passageway extending between the inlet and outlet ends thereof, a valve supported by the piston arranged to close the by-pass passageway upon movement of the piston to the inlet of the casing and open the passageway upon movement of the piston to the outlet of the casing, a valve controlling the flow of lubricant through the inlet of the casing and means resiliently urging the piston to the inlet end of the casing.

13. A lubricant metering device comprising, a body member having integrally joined intake and outlet portions, a lubricant metering chamber extending inwardly from the end of the outlet portion having a cup shaped metering piston having an annular portion reciprocable therein, an intake passageway extending inwardly from the end of the intake portion to the chamber, an intake valve therein arranged to permit flow of the lubricant to the chamber but prevent return flow therefrom, an outlet member secured to the end of the outlet portion having a lubricant passageway therethrough arranged to form a stop for the piston, and a resilient member having one end thereof engaging the annular portion of the piston and the other end thereof engaging the outlet member for urging the piston to the intake end of the chamber, the piston and the resilient member being removable from the chamber solely upon the removal of the outlet member from the outlet portion.

14. A lubricant metering device comprising, a casing having an inlet and an outlet, a metering chamber in the casing between the inlet and outlet, a valve in the inlet for preventing back flow of lubricant from the chamber, a metering piston movable in the chamber between the inlet and outlet, a seat at the outlet for limiting the movement of the piston when moved toward the outlet, and a leakage groove in the seat for preventing hydraulic locking of the piston on the seat.

15. A device for metering lubricant from a supply line to a plurality of parts to be lubricated comprising, a body member having a cylindrical intake portion and a cylindrical metering portion positioned parallel to the intake portion, the ends of the metering portion extending beyond the ends of the intake portion, a supply line connected to each end of the intake portion, a metering chamber in each end of the metering portion communicating with the bore of the intake portion, metering pistons in the chambers for metering fixed quantities of lubricant from the line to the parts upon alternately establishing and releasing pressure at the line, and feed lines connected between each end of the metering portion and correlated parts to be lubricated.

16. A device for metering lubricant from a supply line to a part to be lubricanted comprising, a body member having a cylindrical intake portion, a cylindrical metering portion formed parallel to the intake portion, the metering portion having a plurality of metering chambers therein, an intermediate cylindrical portion connecting the intake and metering portions substantially at the midpoints thereof, the intermediate portion having a bore connecting the bore of the intake portion and the inlet ends of the metering chambers, a supply line connected to each end of the intake portion, feed lines connected to each end of the metering portion arranged to supply lubricant to the parts, and metering pistons in the chambers for metering fixed quantities of lubricant from the line to the parts upon alternately establishing and releasing pressure at the supply line.

17. A device for metering lubricant comprising, a casing including a metering chamber having an inlet at one end and an outlet at the other end thereof, a piston slidably engaging the walls of the chamber, a by-pass port between the inlet and outlet sides thereof, a by-pass valve supported by the piston arranged to close the port upon movement of the piston to the inlet end of the chamber and open the port upon movement thereof to the outlet end of the chamber, and a resilient member having one end thereof fixed at the outlet end of the chamber and the other end thereof engaging the piston independently of the by-pass valve.

18. A device for metering lubricant comprising, a casing including a metering chamber having an inlet at one end and an outlet at the other end thereof, a piston slidably engaging the walls of the chamber arranged to move between the inlet and outlet ends thereof, a by-pass port between the inlet and outlet sides of the piston, a by-pass valve supported by the piston arranged to close the port upon movement of the piston to the inlet end and open the port upon movement thereof to the outlet end of the chamber, and a resilient member having one end thereof fixed at the outlet end of the chamber and the other end thereof engaging the piston, the movement of the by-pass valve by the piston being independent of the resilient member.

19. A device for metering lubricant comprising, a casing including a metering chamber having an inlet and an outlet, a metering piston slidably engaging the walls of the chamber movable between the inlet and outlet, a by-pass port in the piston between the inlet and outlet sides thereof, a by-pass valve supported by the piston arranged to close the port upon movement of the piston to the inlet end of the chamber and open the port upon movement thereof to the outlet end of the chamber, a resilient member having one end thereof fixed at the outlet end of the chamber and the other end thereof engaging the piston, the movement of the by-pass valve being independent of the resilient member, and a valve in the inlet arranged to permit flow of lubricant to the chamber but prevent return flow therefrom.

20. A device for metering lubricant comprising, a casing including a metering chamber having an inlet and an outlet, a metering piston movable in the chamber between the inlet and outlet for metering lubricant, a by-pass port between the inlet and outlet sides of the piston for conveying the lubricant therethrough, and a by-pass valve supported by the piston arranged to close the port during the final movement of the piston to the inlet end of the chamber and open the port during the final movement of the piston to the outlet end of the chamber, the movement of the by-pass valve by the piston being independent of the velocity or impulse flow of the lubricant during the flow thereof through the device.

21. A device for metering lubricant comprising, a casing including a metering chamber having an inlet and an outlet, a metering piston movable in the chamber between the inlet and outlet for metering lubricant, a by-pass port between the inlet and outlet sides of the piston for conveying the lubricant therethrough, and a by-pass valve supported by the piston arranged to close the port during the final movement of the piston to the inlet end of the chamber and open the port during the final movement of the piston to the outlet end of the chamber, the movement of the by-pass valve by the piston being independent of the pressure of the lubricant during the flow thereof through the device.

22. A device for metering lubricant comprising a casing including a metering chamber having an inlet and an outlet, a metering piston movable in the chamber between the inlet and the outlet for metering lubricant, a by-pass port between the inlet and outlet sides of the piston for conveying lubricant therethrough, a by-pass valve supported by the piston arranged to close the port during the final movement of the piston to the inlet end of the chamber and open the port during the final movement of the piston to the outlet end of the chamber, the by-pass valve normally closing the port when the piston is normally positioned at the inlet end of the chamber, and means normally urging the piston to the inlet end of the chamber.

23. In a lubricant metering device for connection between a lubricant supply line and a part to be lubricated, a casing having an intake bore at the inlet end and a metering bore at the outlet end spacedly from the intake bore, an inlet port connecting the bores, an annular valve seat member in the intake bore spacedly from the inlet port, an inlet valve normally seating on the annular valve seat member therebetween and the inlet port, a spring between the valve and the port, and metering means including a metering piston in the metering bore co-operating with the inlet valve for metering substantially fixed quantities of lubricant from the supply line to the part upon establishing pressure in the line alternately with releasing the pressure thereof.

24. In a lubricant metering device for connection between a lubricant supply line and a part to be lubricated, a casing having an intake bore at the inlet end and a metering bore at the outlet end spacedly from the intake bore, an inlet port connecting the bores through the space therebetween, an annular valve seat member in the intake bore spacedly from the inlet port, an inlet valve normally seating on the valve seat member therebetween and the inlet port, a spring between the valve and the port for seating the valve, a retaining member in the intake bore between the valve seat member and the inlet end of the bore positioned spacedly from the valve seat member, lubricant filtering means in the space between the retaining and valve seat members, and metering means including a metering piston in the metering bore co-operating with the inlet valve for metering substantially fixed quantities of lubricant from the supply line to the part upon alternately establishing and releasing pressure thereof in the line.

25. In a lubricant metering device arranged to be connected between a lubricant supply line and a part to be lubricated, a casing having intake and metering bores successively between the inlet and outlet ends thereof, an intake valve in the intake bore permitting flow of lubricant from the supply line to the metering bore but preventing return flow thereof to the line, means in the metering bore including a metering piston movable between the inlet and outlet ends of the bore normally positioned at the inlet end thereof arranged to meter substantially fixed quantities of lubricant in the metering bore upon movement thereof to the outlet end of the bore in response to establishing pressure in the supply line, and means resiliently returning the piston to the inlet end of the bore upon release of the pressure for transferring the metered lubricant to the outlet side of the piston for movement to the part upon again establishing pressure in the line.

26. In a lubricant metering device, a casing having a lubricant metering bore between the inlet and outlet ends thereof, an inlet valve in the inlet end of the casing permitting flow of lubricant to the metering bore but preventing return flow, a metering piston in the metering bore including a by-pass valve and passageway therefor arranged to prevent flow of lubricant from one side of the piston to the other during movement of the piston from the inlet to the outlet end of the bore but permit flow thereof from one side to the other during the movement of the piston from the outlet to the inlet end of the bore, and means normally resiliently urging the piston to the inlet end of the bore.

27. In a lubricant metering device arranged to be connected between a lubricant supply line and a part to be lubricated, a unitary casing having an intake bore and a metering bore formed successively between the inlet and outlet ends thereof, metering means including a check valve permitting flow of lubricant from the supply line through the intake bore to the metering bore but preventing return flow thereof to the supply line and a piston in the metering bore for metering substantially fixed quantities of lubricant from the supply line to the part upon alternately establishing and releasing pressure on the supply line, an attachment screw thread on the inlet end of the casing for screw attachment to the supply line, and another attachment screw thread on the outlet end of the casing for screw attachment of the metering device to the part to be lubricated, the portion of the casing between the attachment screw threads being formed continuously without any joints therein.

OSCAR A. ROSS.